United States Patent
Huang et al.

(10) Patent No.: US 11,885,670 B2
(45) Date of Patent: Jan. 30, 2024

(54) SMART STADIUM APPLICATIONS USING FIBER OPTIC SENSING

(71) Applicant: NEC Laboratories America, Inc., Princeton, NJ (US)

(72) Inventors: Ming-Fang Huang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/195,544

(22) Filed: Mar. 8, 2021

(65) Prior Publication Data

US 2021/0310858 A1   Oct. 7, 2021

Related U.S. Application Data

(60) Provisional application No. 63/006,147, filed on Apr. 7, 2020.

(51) Int. Cl.
*G01H 9/00* (2006.01)
*G01K 11/32* (2021.01)
*G01L 1/24* (2006.01)

(52) U.S. Cl.
CPC .......... *G01H 9/004* (2013.01); *G01K 11/32* (2013.01); *G01L 1/242* (2013.01)

(58) Field of Classification Search
CPC ........ G01H 9/004; G01K 11/32; G01L 1/242
See application file for complete search history.

(56) References Cited

U.S. PATENT DOCUMENTS 8,121,442 B2 * 2/2012 Huffman ............... G01H 9/004
                                                              385/12
10,062,278 B2 * 8/2018 Maier ................... G08G 1/147

* cited by examiner

*Primary Examiner* — John Bedtelyon
(74) *Attorney, Agent, or Firm* — Joseph Kolodka

(57) ABSTRACT

Aspects of the present disclosure describe distributed fiber optic sensing (DFOS) systems, methods, and structures that advantageously are employed in smart stadium or other venue applications, such applications including: parking lot security and management; intrusion detection; social sensing; air quality monitoring and early fire detection—among others.

7 Claims, 5 Drawing Sheets

SMART STADIUM APPLICATIONS USING FIBER OPTIC SENSING

CROSS REFERENCE

This disclosure claims the benefit of U.S. Provisional Patent Application Ser. No. 63/006,147 filed 7 Apr. 2020 the entire contents of which is incorporated by reference as if set forth at length herein.

TECHNICAL FIELD

This disclosure relates generally to distributed fiber optic sensing (DFOS) applications directed to smart stadium, or other public venues where large numbers of persons gather.

BACKGROUND

Distributed fiber optic sensing systems have shown great utility in a number of unique sensing applications due to their intrinsic advantages over conventional techniques. They can be integrated into normally inaccessible areas and can function in harsh environments. They are immune to radio frequency interference and electromagnetic interference and can provide continuous, real-time measurements along an entire length of a fiber optic cable.

Given such utility, DFOS sensing may advantageously enable numerous applications directed to stadium or large public venue monitoring, management, and security.

SUMMARY

An advance in the art is made according to aspects of the present disclosure directed to distributed fiber optic sensing systems (DFOS), methods, and structures that are advantageously applied to stadium and/or large public venues.

According to certain aspects of the present disclosure, a DFOS infrastructure may advantageously be used in smart stadium or other venue applications, such applications including parking lot security and management; intrusion detection; social sensing; air quality monitoring and early fire detection—among others.

BRIEF DESCRIPTION OF THE DRAWING

A more complete understanding of the present disclosure may be realized by reference to the accompanying drawing in which.

DESCRIPTION

Figure 1:
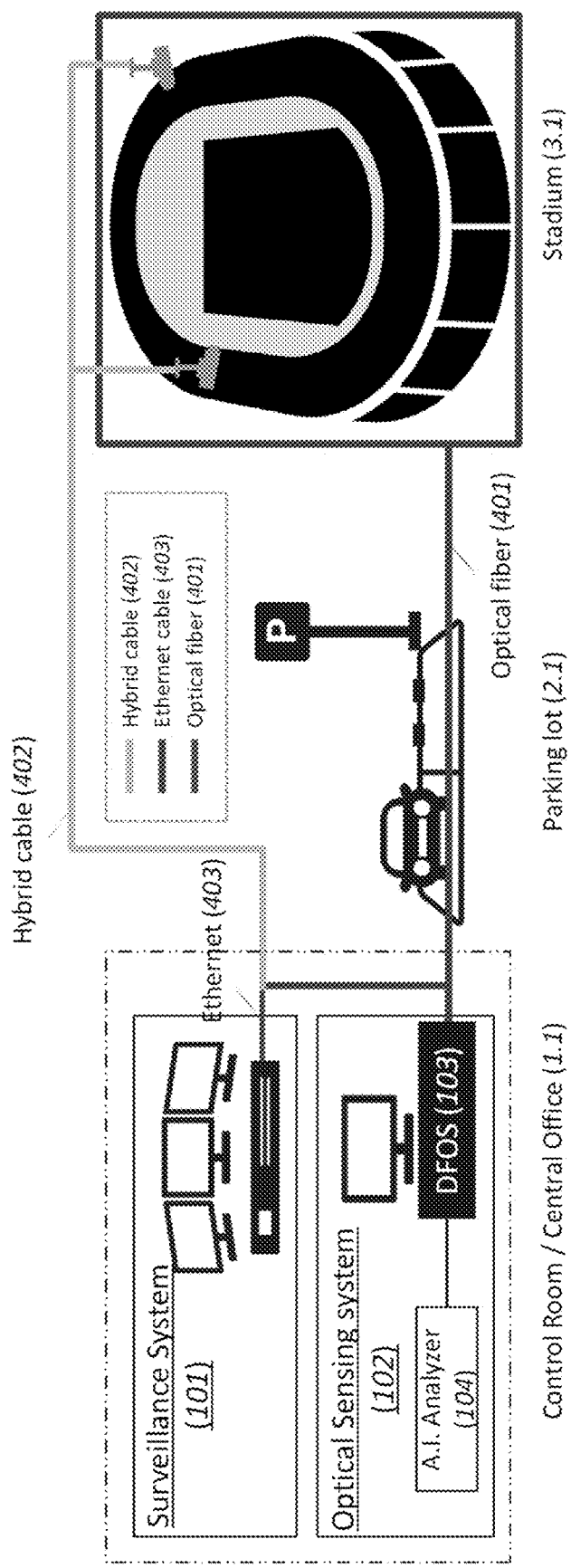
FIG. 1 is a schematic diagram showing an illustrative smart stadium employing distributed fiber optic sensing (DFOS) technologies according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DVS (Distributed Vibration Sensor) or DAS (Distributed Acoustic Sensor) interrogator to recover a vibration occurring anywhere along a sensing fiber in equivalent sampling frequency of the pulse repetition rate. For example, for a DVS or DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule. In addition, specialized gas sensors in communication with the DFOS may advantageously provide the monitoring of gas molecules as well.

FIG. 1 is a schematic diagram showing an illustrative smart stadium employing distributed fiber optic sensing (DFOS) technologies according to aspects of the present disclosure.

As will be appreciated by those skilled in the art—and according to aspects of the present disclosure—a DFOS smart stadium application may advantageously exploit DFOS technologies (i.e., distributed temperature sensing (DTS), distributed strain sensing (DSS), distributed vibration sensing (DVS), and distributed acoustic sensing (DAS)—among others) with machine learning-based intelligent analyzer is shown in the FIG. 1. When DFOS according to aspects of the present disclosure is so advantageously applied to illustrative stadium applications, it may be understood to be applied to three distinct stadium areas or applications namely, operation, sensing, receiving, and analyzing applications illustratively performed in a control room (1.1); parking lot applications (2.1); and peripheral applications performed in areas generally adjacent to the stadium or venue (3.1).

Operationally, one or more single optical fiber cable (401) are located/installed (laid) around a periphery of the stadium, including parking lots, in addition to other locations both inside and outside of the stadium to obtain sensing data associated with acoustic, strain and vibration events for a plurality smart stadium applications. Additionally—and of particular advantage—an existing surveillance system (101) employing optical fiber cable may advantageously be employed as a sensing medium as well as a video surveillance transmission medium. In alternative configurations, hybrid cable arrangements (402) that may include both unshielded twisted-pair (Ethernet) cable (403) and optical fiber (401) can be utilized for simultaneous communication and sensing. We note that as used herein—the term Ethernet cable is used to describe facilities that carry 802.x compatible signals and framing (physical/logical layers) regardless of physical medium employed.

Note that as shown schematically in the illustrative figure, optical sensing system (102), and DFOS systems (103) are shown located in a control room (1.1) which provides remote monitoring for entire facility (i.e., parking lots, stadiums, etc.). After receiving the sensing data captured from the optical fiber (401), the received data is transmitted a second aspect of A.I. analyzer (104). Such aspect may advantageously include a machine learning-based intelligent analyzer that receives as input sensing data from the DFOS and provides as output notification to operators and/or others that may in include attendees to the stadium venue.

With this overall architecture according to aspects of the present disclosure, we may now present four applications including: parking lot security and occupancy detection, stadium intrusion detection, social sensing inside stadium and air quality monitoring and early fire detection.

Parking Lot Security and Occupancy Detection Application

Figure 2:
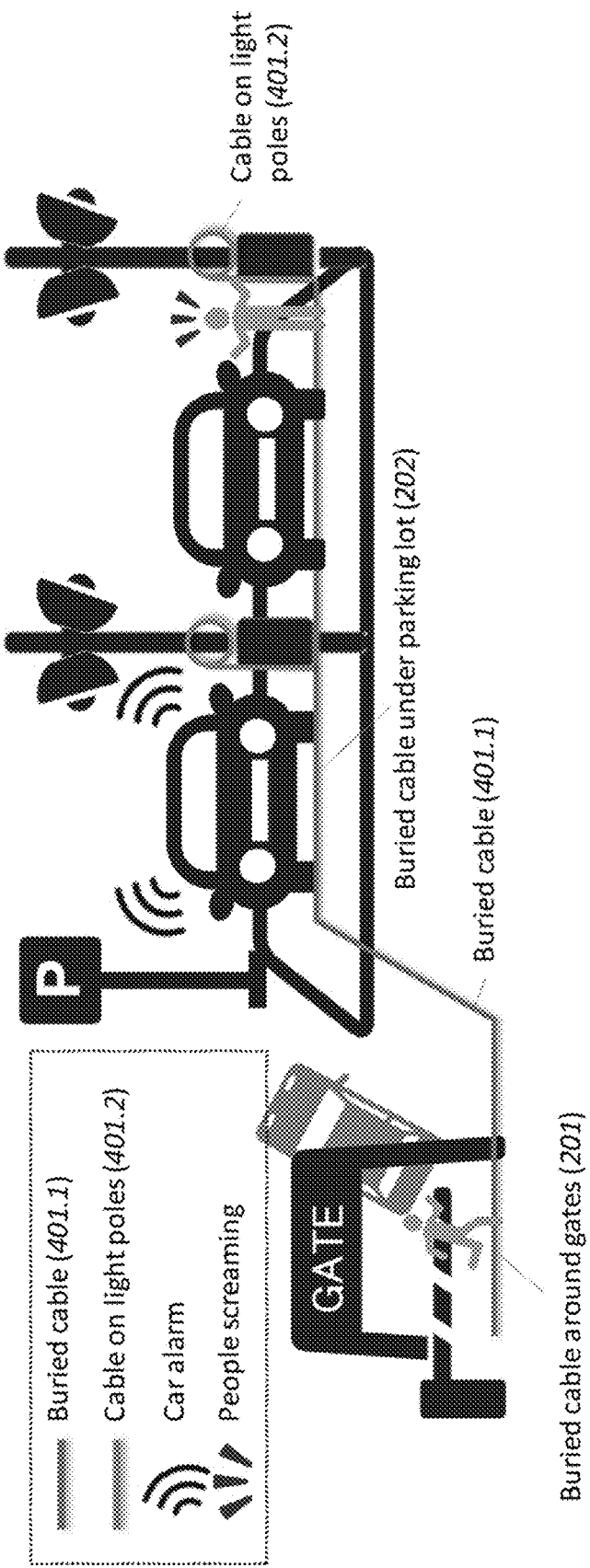
FIG. 2 is a schematic diagram showing an illustrative smart stadium application employing DFOS technologies providing parking lot security and occupancy detection according to aspects of the present disclosure.

FIG. 2 is a schematic diagram showing an illustrative smart stadium application employing DFOS technologies providing parking lot security and occupancy detection according to aspects of the present disclosure. As shown in the figure, optical fiber cable (401) that traverses/crosses a parking lot may be installed as buried under pavement (401.1) or suspended overhead on light poles (401.2). Advantageously, where such optical fiber cable is buried under a gate (201), it may be used for vehicle counting, vehicle axel detection, and vehicle speed estimation. Such application is particularly useful to provide an accurate count of all vehicles and/or axels that have entered the gate and conversely the number of vehicles and/or axels that exit the gate. In such a manner, it may be readily determined whether or not a parking lot or other gated area is at—or about to reach—capacity. When such pre-determined capacity is reached, additional vehicles may not be allowed to enter. Likewise, such count may be used to determine whether or not a parking lot or gated area is emptied. Such ability is particularly important where certain areas are not immediately visible. Note further that such DFOS system monitoring a gated access can detect piggyback events—i.e., those events wherein persons or others try to pass the gate after—for example—a preceding vehicle.

As will be readily understood and appreciated by those skilled in the art, when DVS and/or DSS technologies are employed in a parking area such as that shown, fiber buried under an individual parking space (202) may advantageously provide occupancy detection and parking hours monitoring for that individual space. Furthermore, when DAS technology is employed in a parking lot—acoustic signals may be detected via optical fibers located on poles (401.2). As will be further appreciated, such acoustic monitoring via DAS may advantageously detect persons screaming/yelling and/or automatic alarm signals—for example car alarms. Obviously, the ability to detect such alarms—particularly in large lots—may advantageously provide an early indication of a vehicle theft. Likewise, a human scream detected via DAS may provide for an urgent rescue possibility.

Stadium Intrusion Detection

Figure 3:
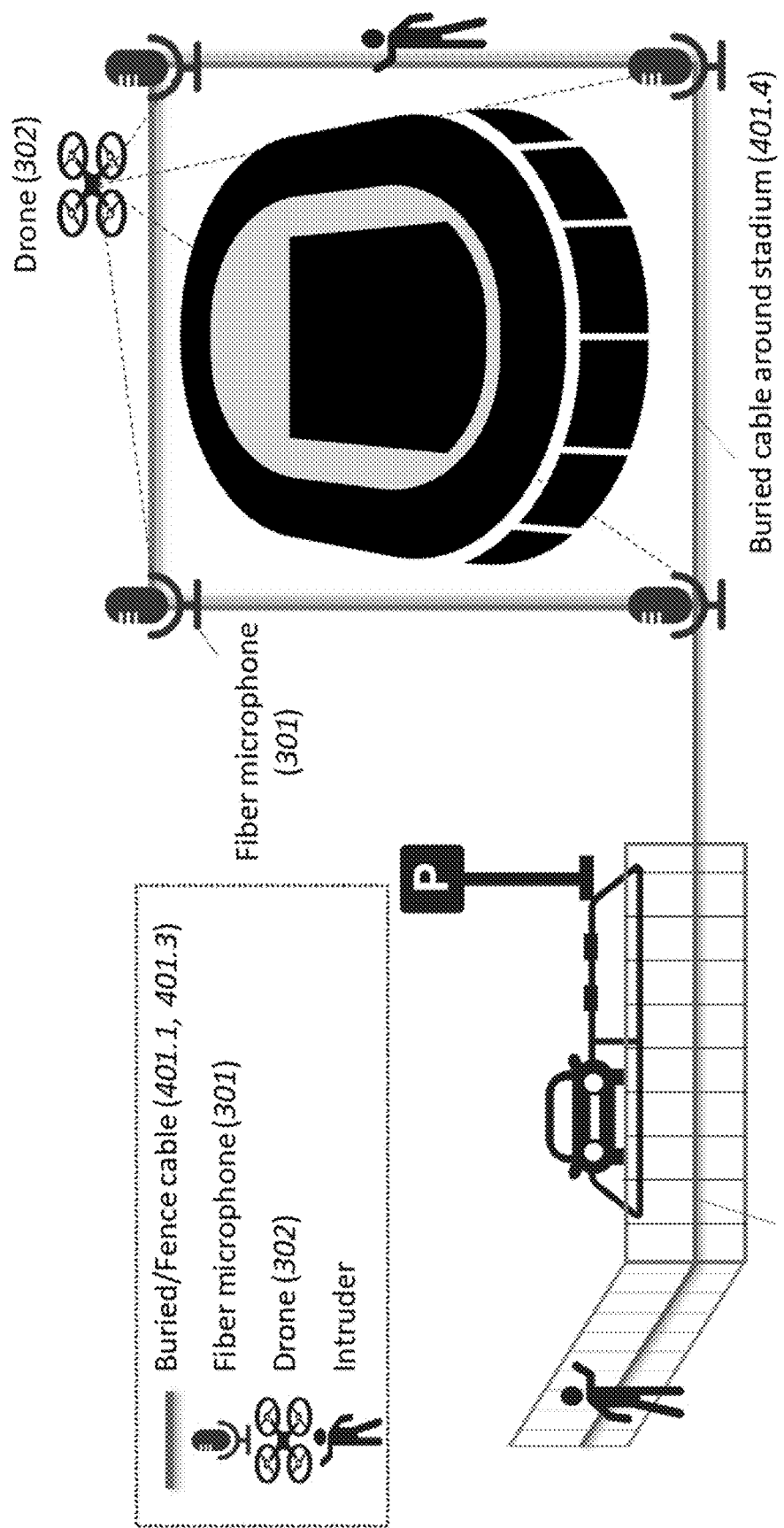
FIG. 3 is a schematic diagram showing an illustrative smart stadium application employing DFOS technologies providing stadium intrusion detection according to aspects of the present disclosure.

FIG. 3 is a schematic diagram showing an illustrative smart stadium application employing DFOS technologies providing stadium intrusion detection according to aspects of the present disclosure.

As will be appreciated by those skilled in the art, stadium intrusion detection is an important consideration to deter/prevent vandalism to stadium facilities as well as detecting/preventing unauthorized access/entry and any security implications from such access/entry. As illustratively shown in FIG. 3, such consideration(s) may include both human and drone access/entry.

To facilitate/provide detection of human intruders, an optical fiber cable may be positioned/laid on/along/underneath parking lot fences/walls (401.3) and/or provided (buried, laid) around the stadium (401.4).

Operationally, an A.I. engine identifies an abnormal or other activity associated with human intruders which may generate alarms/reports at an early point in such activity. Those skilled in the part will understand and appreciate that—due to their ready availability and sophistication—an increasing number of drone aircraft are employed in a number of applications by a number of persons—oftentimes without control/registration of such activity. In order to avoid unexpected drones flying undesirably close to a stadium, fiber microphones (301) are shown in the figure which detect any sound(s) produced by the drone(s). Those skilled in the art will understand and appreciate that a fiber microphone may be effected by a coil (loops) of optical fiber which advantageously act as a sensitive, electricity-free microphone. In an illustrative application, three (or more) such fiber microphones can advantageously triangulate and thereby determine a location of a drone while additional fiber microphones (i.e., 4*h* one) may be employed to determine an altitude (height) of the drone.

Social Sensing Inside Stadium

Figure 4:
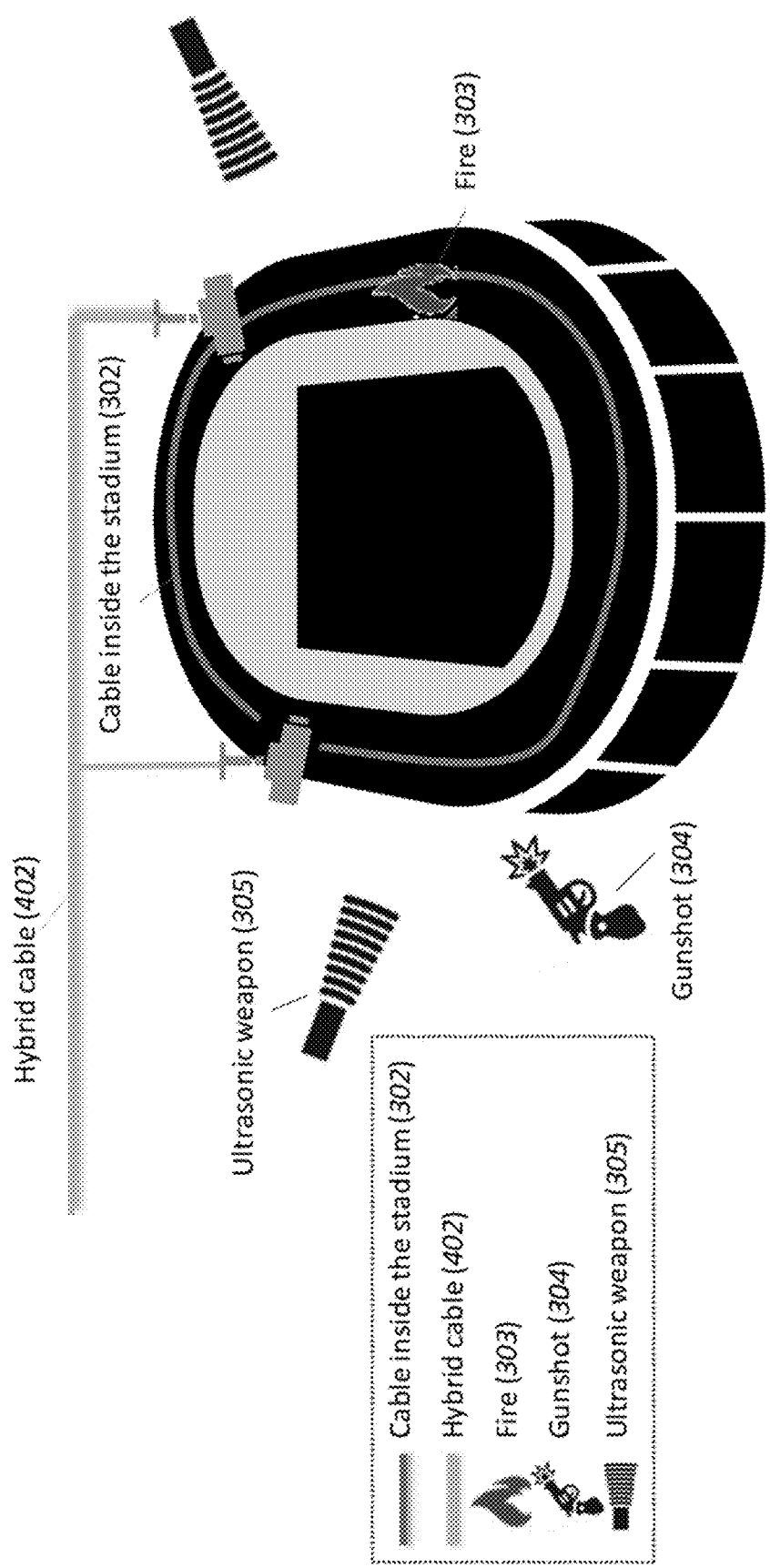
FIG. 4 is a schematic diagram showing an illustrative smart stadium application employing DFOS technologies providing social sensing inside the stadium according to aspects of the present disclosure.

FIG. 4 is a schematic diagram showing an illustrative smart stadium application employing DFOS technologies providing social sensing inside the stadium according to aspects of the present disclosure.

To provide social sensing inside a stadium or other venue, DAS and DTS technologies may advantageously be employed. As illustratively shown in FIG. 4 such social sensing may be provided via an optical cable laid or otherwise disposed/installed inside stadium (302) separate from/with or as hybrid cable (402) as part of a video surveillance system. For temperature monitoring, a DFOS system may advantageously detect and localize any abnormal temperature(s) due to—for example—a fire (103) inside the stadium. Since an active threshold of sprinklers may be set to—for example—73° C. (163° F.), such DTS system provides an early warning and localization for fire prevention and/or detection/response. Additionally, since the available bandwidth of optical fiber to detect acoustic frequencies is wide, i.e.,—from few Hz to hundred MHz—such fiber can be used to detect a gunshot and/or sonic/ultrasonic weapon(s) and provide a safer environment for participants/fans at stadium events.

Air Quality Monitoring and Early Fire Detection

Figure 5:
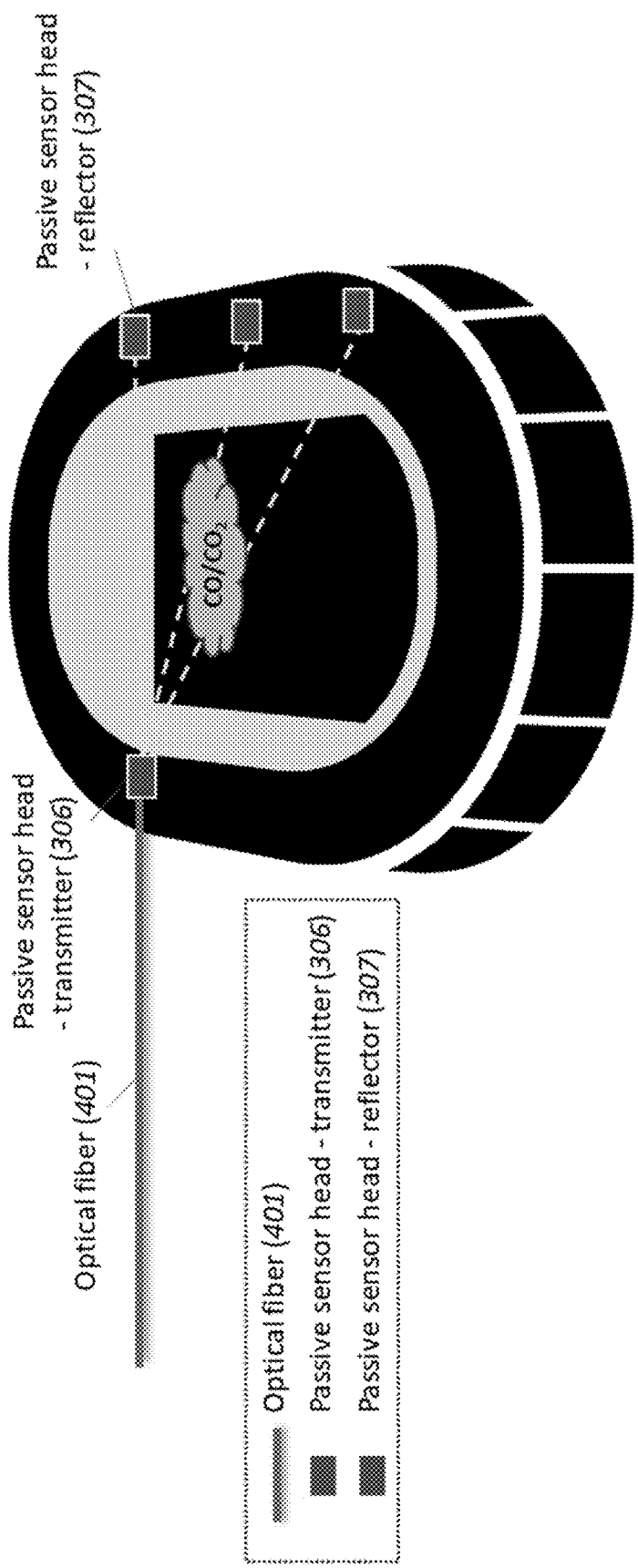
FIG. 5 is a schematic diagram showing an illustrative smart stadium application employing DFOS technologies providing air quality monitoring and early fire detection according to aspects of the present disclosure.

FIG. 5 is a schematic diagram showing an illustrative smart stadium application employing DFOS technologies providing air quality monitoring and early fire detection according to aspects of the present disclosure.

As will be understood and appreciated by those skilled in the art, air quality inside a stadium or other venue is one key element that requires monitoring for both safety and comfort concerns issues. As shown in FIG. 5, an illustrative fiber-based gas sensing system for air quality monitoring and early fire detection is illustrated. As shown, optical fiber (401) transmits optical signals to sensor heads. Two types/kinds of passive sensor heads are employed namely, a transmitter sensor head (307) and reflector sensor head (308). Any gas molecules such as CO and $CO_2$ can be sensed along the free space light path (306). Based on $CO_2$ detection levels, air quality within the stadium can be determined and ventilation systems may be activated/controlled—as indicated/required. Oftentimes, materials will release CO before fire ignition. The proposed fiber-based gas sensing technology will detect CO concentration before fire ignited thereby providing an early warning fire prevention capability.

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed fiber optic sensing (DFOS) system for parking lot monitoring and control, said system comprising:
   a length optical fiber cable installed throughout selected areas of the parking lot;
   a DFOS interrogator system in optical communication with the optical fiber cable; and
   an intelligent analyzer configured to analyze DFOS sensing data received by the DFOS interrogator system, said analyzer configured to track vehicles entering and track vehicles exiting the parking lot and provide occupancy detection and parking hours monitoring for individual parking spaces in the parking lot from the analyzed sensing data.

2. The DFOS system of claim 1 wherein the vehicles enter and exit the parking lot through a gate.

3. The DFOS system of claim 2 wherein the vehicles are only allowed to enter the parking lot when the number of vehicles in the lot are less than a pre-determined threshold number.

4. The DFOS system of claim 2 wherein the system determines if a succeeding vehicle is attempting to enter the lot during an authorization of a preceding vehicle.

5. The DFOS system of claim 1 including distributed vibration sensing (DVS) and distributed strain sensing (DSS).

6. The DFOS system of claim 1 including a length of underground optical fiber and a length of overhead optical fiber.

7. The DFOS system of claim 6 wherein the overhead optical fiber is a distributed acoustic sensing (DAS) medium that detects sounds in the parking lot.

* * * * *